May 21, 1929.　　　N. LOMBARD　　　1,714,229
RIM TOOL
Filed Oct. 3, 1927　　　2 Sheets-Sheet 2
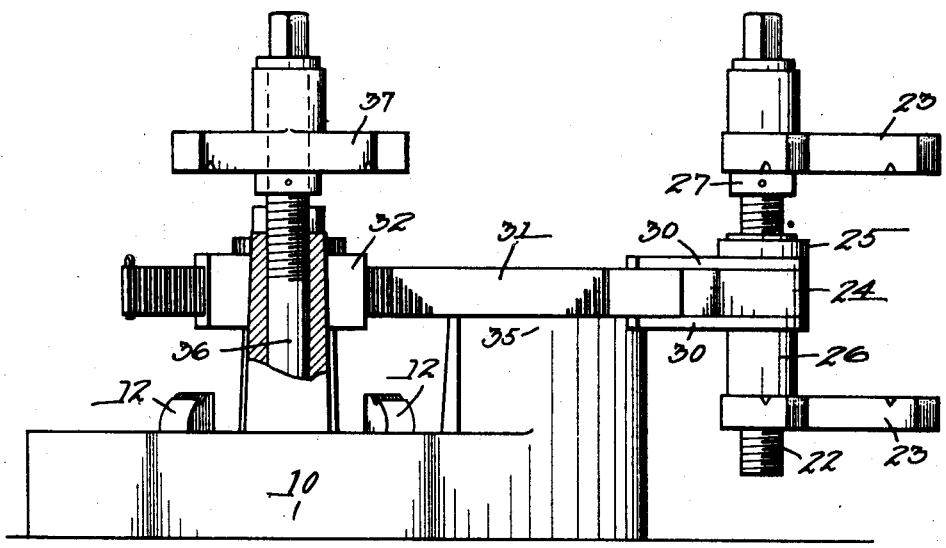
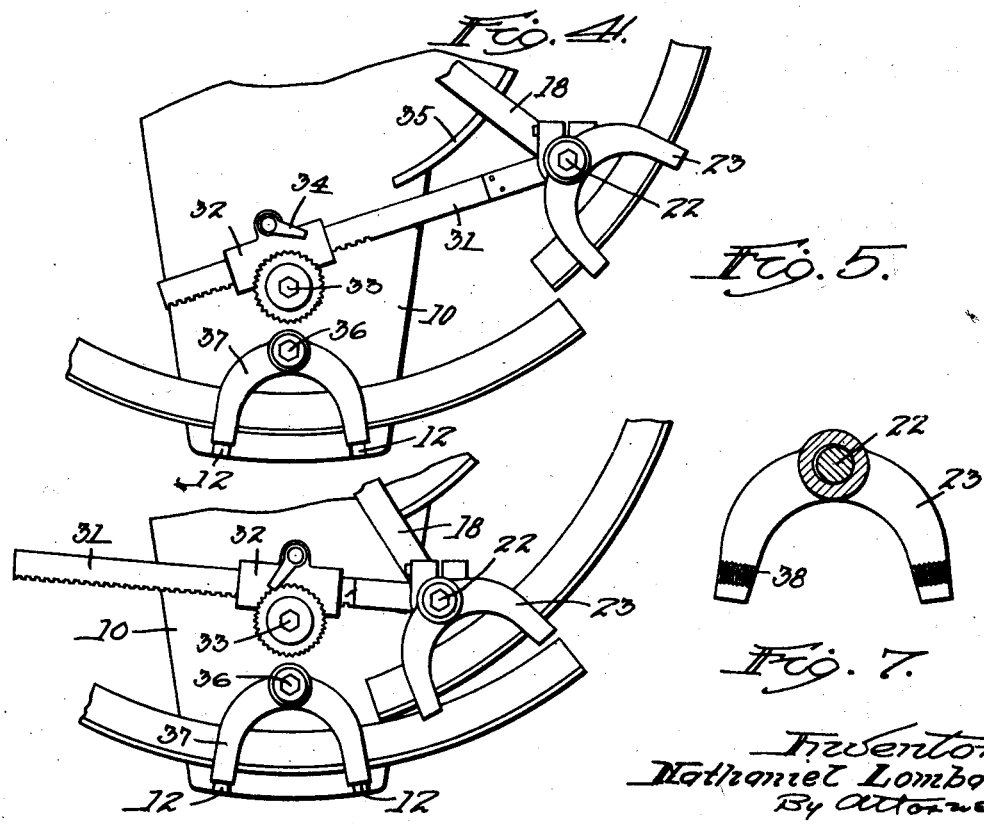
Inventor
Nathaniel Lombard
By Attorneys
Southgate Fay & Hanley Patented May 21, 1929.

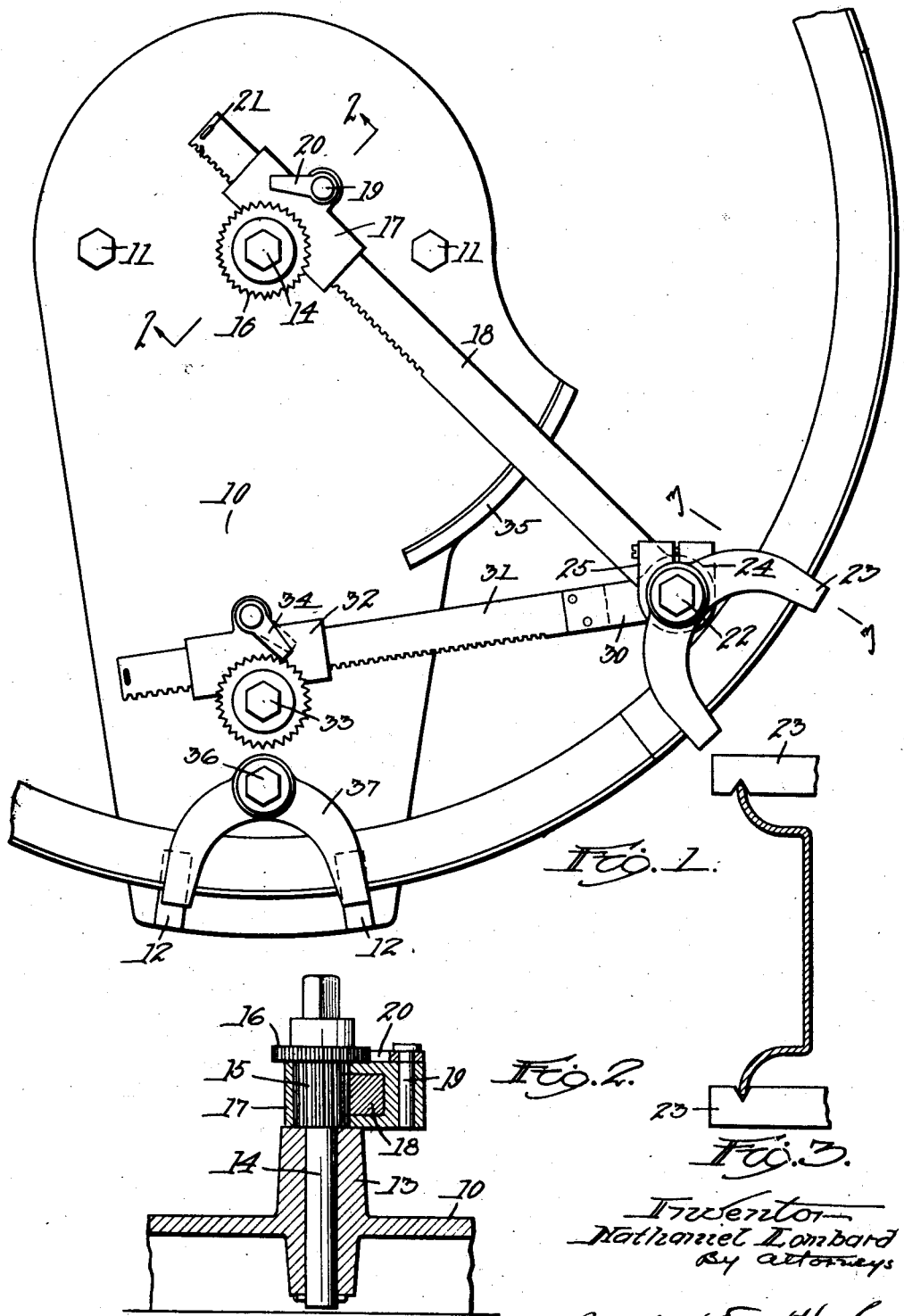

1,714,229

UNITED STATES PATENT OFFICE.

NATHANIEL LOMBARD, OF WORCESTER, MASSACHUSETTS.

RIM TOOL.

Application filed October 3, 1927. Serial No. 223,546.

This invention relates to a tool for use in contracting and expanding split rims.

The principal objects of the invention are to provide a tool of this character which is self-contained and consists of comparatively few parts and yet is effective for the purpose of contracting a rim and bringing the inner end inwardly circumferentially so as to make it comparatively easy to take off and put on a tire and which will restore the rim to its expanded condition in an expeditious and positive manner.

The invention involves means for grasping the end of the rim and drawing it in radially, means for then drawing the inner end circumferentially inwardly, said means connected together but operating separately, and means for holding the parts in their contracted position while the tire is being changed, a base on which these parts are mounted which constitutes means for holding them in proper position while they are being operated, and while the rim is contracted, and means by which the ends of the rim are gripped firmly while the device is in operation.

Other objects and advantages of the invention will appear hereinafter.

Reference is to be had to the accompanying drawings in which—

Fig. 1 is a plan of an entire rim tool constructed in accordance with this invention;

Fig. 2 is a sectional view on the line 2—2 of Fig. 1;

Fig. 3 is a sectional view on the radial line 3—3 of Fig. 1;

Fig. 4 is a side view showing the tool with no rim in place and showing parts in section;

Fig. 5 is a plan showing the position of the parts when the end of the rim is drawn in radially;

Fig. 6 is a similar view showing the rim entirely contracted, and

Fig. 7 is a plan of one of the rim clamps.

The device is provided with a base or frame 10 supporting all the rest of the mechanism. This can be bolted down on a flat surface by bolts 11 and is provided with a pair of integral rests or jaws 12 on which the rim is adapted to be supported at a point near the split therein. The base 10 supports a vertical stud 36 carrying a pair of jaws 37 cooperating with the jaws 12 and located directly over them to hold one end of the rim. These jaws can be clamped down by the nut.

At a point which corresponds with the center of the rim, or at any rate at a point at considerable distance from the rim jaws or rests 12, is a hub 13 integral with the base. In this is a vertical shaft 14 which is provided with a square or hexagonal end for the reception of a wrench or spanner for turning it. This shaft is freely rotatable on its own axis in the hub and carries upon it a pinion 15 and ratchet wheel 16 both fixed to the shaft.

Mounted to swing freely on the axis of the stud 14 is a frame 17 having a longitudinal passage therethrough which constitutes a guide for a rack bar 18, the rack on one side of which meshes with the pinion 15. The frame 17 also carries a pivot stud 19 on which a pawl 20 is pivoted to engage the ratchet wheel 16 and hold the wheel and pinion against turning. It will be seen that the rack bar 18 is pivoted on the stud 14 to swing freely thereon. The rack has a stop 21 to limit its motion.

The rack bar 18 is provided at the end with a transverse screw 22 to the top and bottom of which are pivoted a pair of jaws 23. The upper one of these is adapted to be adjusted on the screw vertically and they have grooves for receiving the top and bottom surface of the rim. These jaws, therefore, are pivotally mounted with respect to the rack bar 18 and the rack bar and jaws are connected together so as to swing about the center of the screw 22 freely. The rack 18 has a cylindrical end 24 through which the screw passes and the screw is provided with an internally threaded member 26 integral with the lower jaws 23. This has a reduced cylindrical portion extending through the end 24. A clamping collar 25 is located at the top of the member 26 for holding the jaw in a definite vertical position. The lower jaw is always at the same level as the jaw 12 because a shoulder on the member 26 always abuts against the bottom of a plate 30 fixed in height with respect to the jaws 12. A collar 27 holds the upper jaw to the screw in adjusted position so that they both go up and down with the screw. The lower jaws 12 and 23 are permanently located at the same level and the parts are so proportioned that the two racks are always in the same horizontal plane.

The cylindrical hub 24 constituting the end of the rack bar 18 is received between two plates 30 which are secured to the end of a second rack bar 31. These two plates are perforated and are located above and below the hub 24 and thereby pivoted on the screw 22. The rack bar 31 extends through a passage in a frame 32 which is pivoted on a stud 33 extending up from the base 10 which is similar to the stud 14. This rack bar 31 is operated by a pinion and ratchet wheel exactly like the corresponding elements 15 and 16 and has a pawl 34 operating like the pawl 20. The jaw 37 is operated up and down by a screw 36 the same as the upper jaw 23.

The rack bar 18 is supported on a raised surface 35 on the base 10. This surface extends upwardly far enough to keep the rack bar in horizontal position and the surface itself is horizontal.

All the bolt heads are of the same size so as to be operated by the same wrench or spanner. The various grooves constituting the jaws 12, 23 and 37 are V-shaped or scored across as shown at 38 in Fig. 7 to more firmly hold the edges of the rim.

In the operation of the device, the rim is placed in the position shown in Fig. 1 resting in the grooves of the lower jaws 12 and 23. The jaws 37 are screwed down on the top of the rim near the split so as to hold this end of the rim in position. Also the upper jaw 23 is screwed down with the screw 22 until it is firmly seated against the top of the rim so as to hold that firmly.

Now the operator turns the stud 14 by means of its hexagonal head, the pawl 20 being thrown out. This draws in the free end of the rim radially as shown in Fig. 4. This free end has a tendency to swing over circumferentially but that is not depended upon for that purpose. The end of the rim can be drawn in as far as necessary and held by the pawl 20. The stud 33 is now turned and the free end of the rim is brought into the position shown in Fig. 6. The two pawls 34 and 20 are swung inwardly to engage the ratchet wheels and to hold the parts in the position in which they have been left. After the tire is removed and replaced the rim can be expanded by the reverse operation using one wrench on one stud and then on the other. To get the rim out it is only necessary to loosen the two screws 36 and 22 which leaves the jaws in position to receive another rim.

It will be seen that all the parts are supported by the base 10 and held in the proper position relative to the rim by the different features of the base. Also the two racks and the upper jaws 23 are all freely pivoted on the screw 22, so as to provide all necessary flexibility. The manipulations for fastening the jaws and for contracting and expanding the rim are very simple and obvious to anyone who sees the machine. No time need be spent in teaching any mechanic to operate it. The two ends of the rim are positively held while being manipulated and they are held in contracted position by the pawls while the tire is changed. The parts are all simple, strong and durable and positively supported.

It is to be understood that, preferably, the side of the rim opposite to that shown in Fig. 1 is supported on a table or bench on which the base 10 is screwed.

Although I have illustrated and described only one form of the invention I am aware of the fact that modifications can be made therein by any person skilled in the art without departing from the scope of the invention as expressed in the claim. Therefore, I do not wish to be limited in these respects, but what I do claim is:—

In a rim tool, the combination with a fixed base having on its upper surfaces a pair of integral lower jaws for receiving the lower edge of the rim, a projection extending upwardly from the side of the base and having a long horizontal top surface and two hollow hubs on the base projecting upwardly therefrom at a distance apart, of a pair of jaws adapted to cooperate with the first-named jaws to hold the top of the rim, said jaws being adjustably mounted on the base a distance above it, two vertical shafts having their bearings in said hubs and each having a pinion thereon resting on the top of its hub, two frames surrounding the pinions and resting on the tops of the hubs, said frames having passages therethrough, and pivoted on said shafts, two racks reciprocably mounted in said passages and meshing with the pinions, whereby the turning of the pinions will reciprocate the racks, the two racks extending in different directions, one substantially radially and the other in a chordal direction, one of said racks resting on the top of said projection and movable along the same, a vertical screw supported at the free end of the rack resting on the support and passing through the free end of the other rack, pivoting them together, a pair of jaws on said screw for engaging the rim on the other side of the split, the screw holding up the second rack, whereby both racks are supported at a distance from said hubs by said projection, and means for turning the pinions to operate the racks.

In testimony whereof I have hereunto affixed my signature.

NATHANIEL LOMBARD.